Patented Aug. 17, 1948

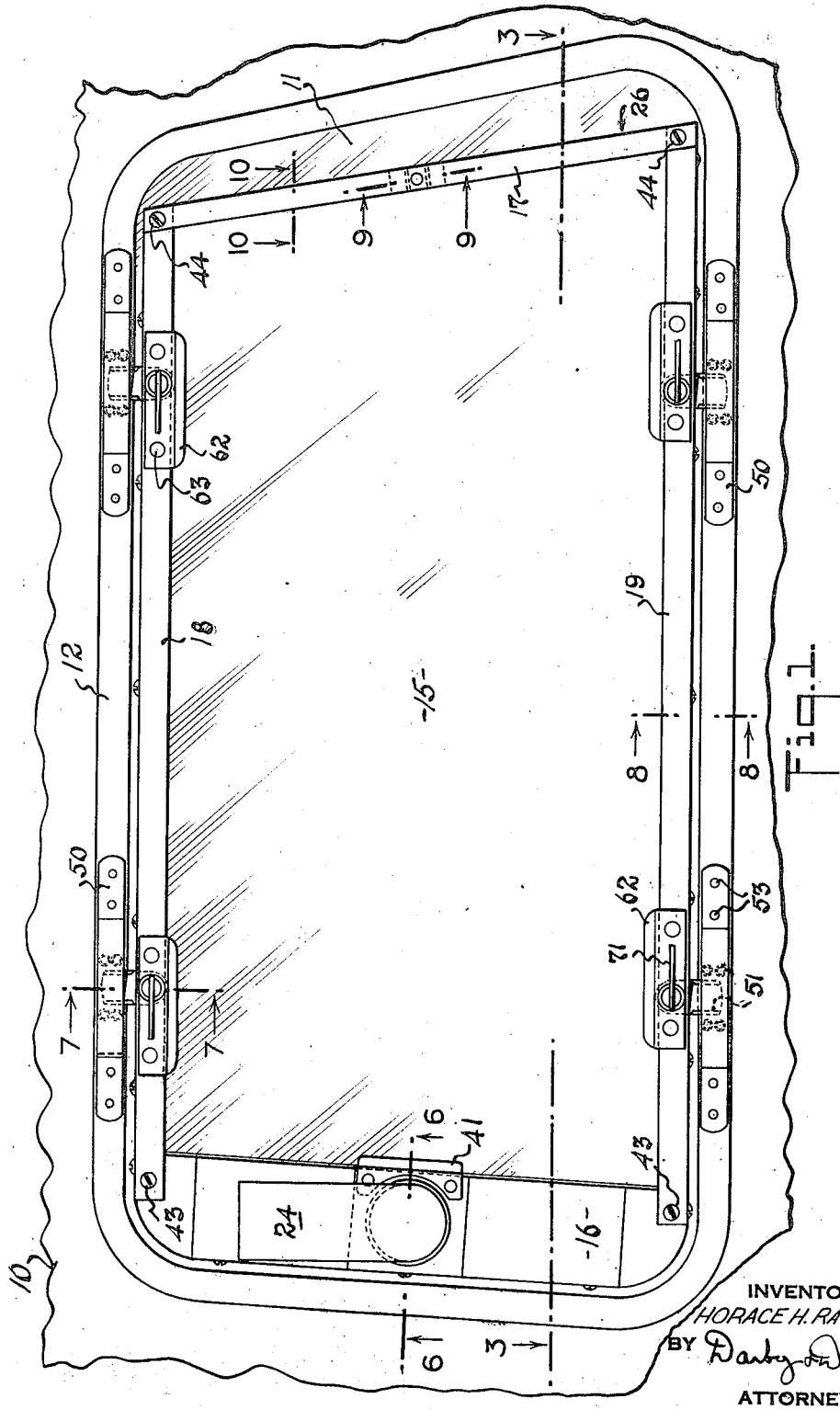

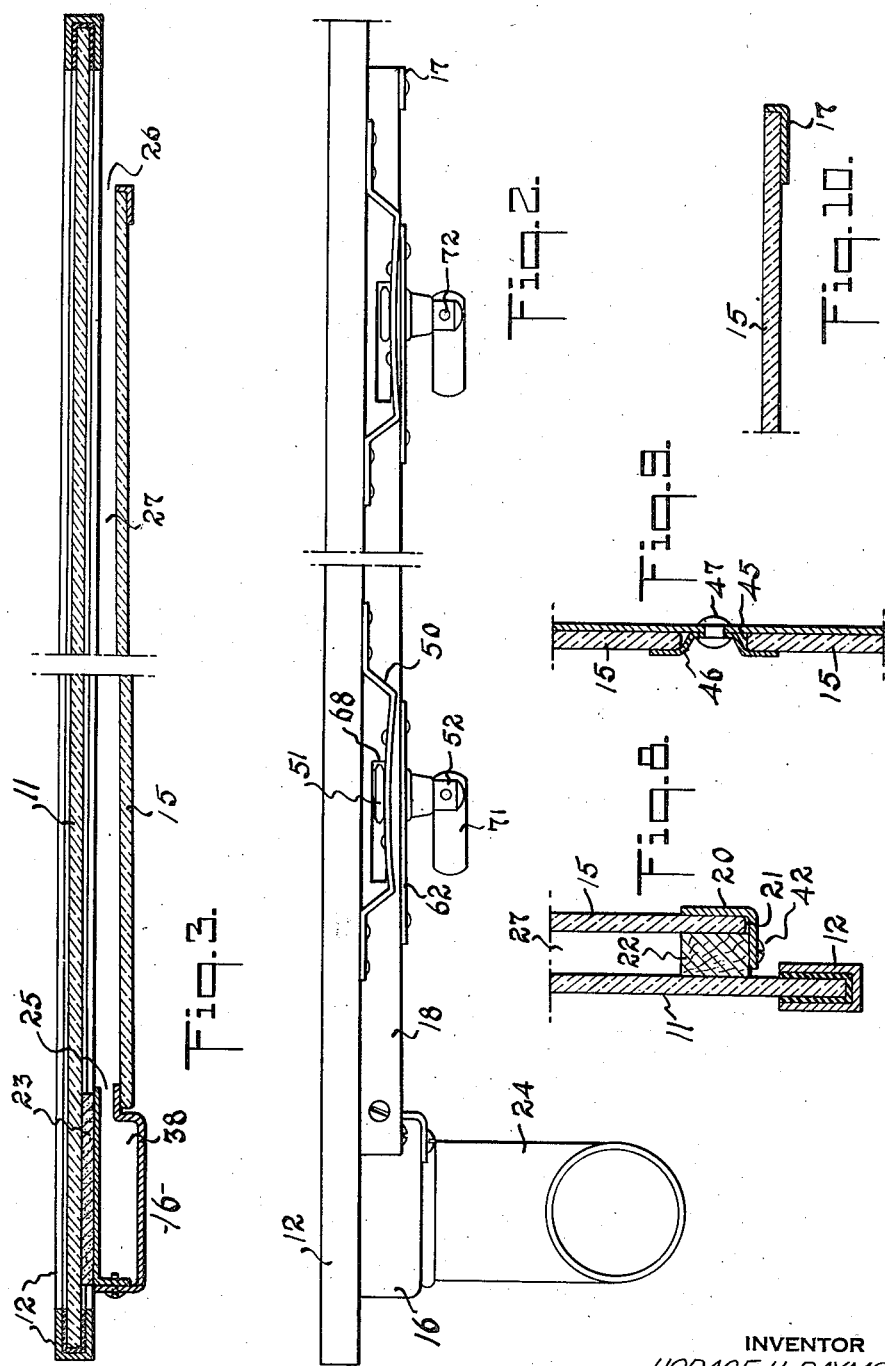

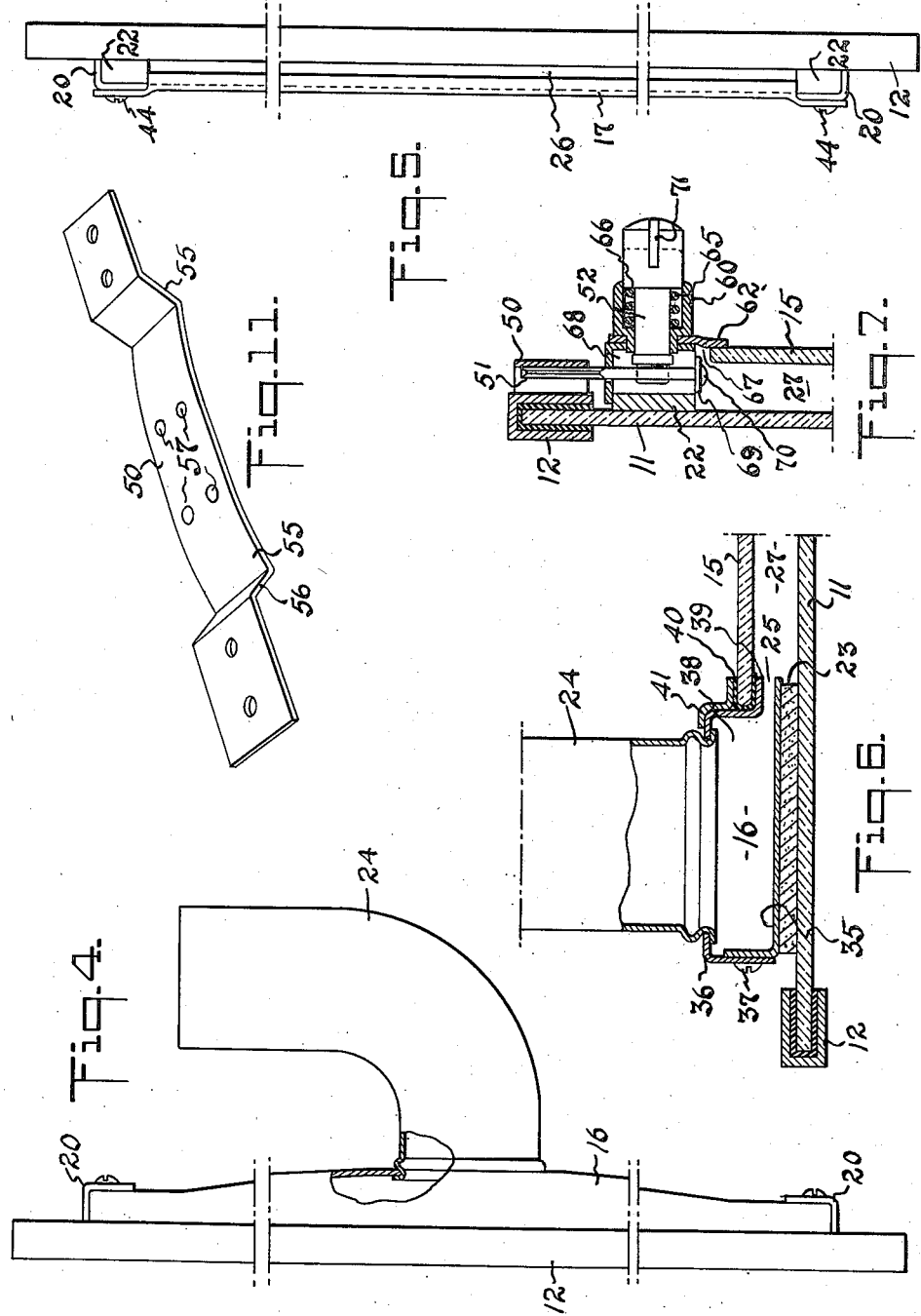

2,447,430

UNITED STATES PATENT OFFICE 2,447,430

APPARATUS FOR PREVENTING THE FORMATION OF ICE ON WINDSHIELDS

Horace H. Raymond, Berlin, Conn., assignor, by mesne assignments, to Raymond De-Icer Co., Inc., Los Angeles, Calif., a corporation of Delaware Application April 8, 1944, Serial No. 530,159

7 Claims. (Cl. 20—40.5)

This invention relates to means for preventing the formation of ice and frost on and removing formations of ice and frost from windshields, and especially the windshields and other windows of aircraft.

An object of the invention is to provide means of this sort, which is highly efficient in that under all conditions, and even under the most severe ones (such as exist when an aircraft is flying in sub-freezing temperatures and encounters rain falling from a warmer region above), by which the ice or frost which accumulates upon the window may be very quickly removed or prevented from forming so that the window may be maintained clear of ice and frost.

A further object of the invention is to provide an improved de-icer arrangement for windshields wherein a stream of hot air is so directed through a thin tapering chamber formed by the windshield and a transparent pane therebehind that cracking of the windshield, particularly at the entrance end of the chamber, is guarded against, and the stream of air is effective to eliminate or greatly reduce the tendency of the air to form an insulating layer on the inside surface of the windshield whereby ice or frost is melted or prevented from forming throughout the entire area of the windshield covered by the de-icer.

A further object is to provide an improved means of this type, characterized by its simplicity of construction, its lightness in weight, and its economy in manufacture and assembly.

A still further object of the invention is to provide a simple and effective unit in the form of an attachment which may be very quickly and easily applied to and removed from the windshield to be protected.

It may be stated that a general object of this invention is to provide a novel form of apparatus and method by means of which relatively large expanses of glass such as represented by the windshield of an airplane may be uniformly heated under all conditions of flight, so as to prevent the formation of ice and frost on the exposed surface thereof, and in the event of the formation of ice and frost under extremely severe conditions, effect the rapid removal thereof.

This application is a continuation in part of my copending application Serial No. 475,816, filed February 13, 1943, for Means for preventing the formation of ice on windshields.

Other objects will be in part obvious and in part pointed out more in detail hereinafter.

The invention accordingly consists in the features of construction, combination of elements and arrangement of parts, steps and series of steps, all as will be exemplified in the construction hereinafter set forth and the scope of the application of which will be indicated in the appended claims.

In the accompanying drawings, wherein is shown one embodiment which the invention may take:

Figure 1 is a rear view of my improved attachment, the same being shown as applied to the window of an airplane;

Figure 2 is a top plan or edge view of my improved attachment applied to a window, the window and a portion of the cabin being shown by broken lines;

Figure 3 is a horizontal sectional view through the device, the same being taken substantially on line 3—3 of Figure 1, looking in the direction of the arrows;

Figure 4 is an end view of the attachment as viewed from the left referring to Figure 1;

Figure 5 is an edge elevational view looking at the right hand end of the attachment;

Figure 6 is a sectional view through the inlet pipe and manifold, this view being taken substantially on line 6—6 of Figure 1, looking in the direction of the arrows;

Figure 7 is a detail view showing in cross-section one of the latching arrangements by means of which the attachment may be quickly and easily secured in place, this view being taken substantially on line 7—7 of Figure 1;

Figure 8 is a detail view in section through the lower edge of the attachment, this view being taken substantially on line 8—8 of Figure 1;

Figure 9 is a detail view taken on line 9—9 of Figure 1 and showing the manner in which the transparent pane may be secured to the frame member located at the exit end of the attachment;

Figure 10 is a sectional view taken on line 10—10 of Figure 1; and

Figure 11 is a detail view of one of the attachment clips.

In the accompanying drawings, the improved attachment is shown as applied to a window such, for example, as a window or windshield of an airplane. This window may be in front of the pilot operating the plane but, obviously, the attachment may be applied to windows generally. In the drawings, a portion 10 of the wall of the plane has an opening in which the windshield or window pane 11 is mounted by means of a frame 12 of any suitable construction.

The de-icer arrangement constructed in accordance with the present invention, as illustrated, comprises, generally, a frame preferably corresponding in shape to, but of slightly lesser size than, the window to which it is to be applied, so as to fit nicely in the frame 12. A transparent pane 15 of suitable plastic, such, for example, as a methyl methacrylate resin is secured in this frame. This frame comprises, generally, a manifold or header 16 located at one end, a frame member 17 in the form of a metal strip located at the other end, and top and bottom member units 18 and 19, respectively. Each of these units comprises a bar 20 of right angular cross section and a rail of wood 22 secured to the horizontal flange of the bar. The rear face of the wooden rail is spaced forwardly of the vertical flange of the bar 20 so as to provide a channel 21 which receives the longitudinal edge of the pane 15. The forward faces of these rails engage the window when the de-icer is in place.

Secured to the forward face of the manifold 16 is a pad or strip of felt 23, the forward face of which lies substantially in the plane of the forward faces of the rails 22. This pad or strip of felt engages the window and serves to insulate the manifold from the window so that the heat of the incoming air will not crack the glass. The manifold has an inlet pipe 24 which may be connected up to any suitable source of hot air (not shown) as by means of a flexible air hose of the accordion type (also not shown). The inlet pipe 24 is swiveled on the manifold (see Figure 6) so as to enable the pilot to adjust the air hose to a position which will least interfere with his vision. The manifold has a thin slot 25 at one side, disposed along one vertical edge of the pane 11. This slot constitutes an entrance opening for the chamber or interspace 27 which is provided between the pane and the windshield when the de-icer device is in place, as most clearly shown in Figure 3. This entrance opening or slot 25 is in a plane generally parallel to, but disposed slightly rearwardly of, the plane of the window when the de-icer is in place so that the stream of incoming air is directed into the interspace 27 in a plane generally parallel to, but slightly spaced from, the window pane 11, and thus the incoming air does not directly impinge upon the glass pane at the region of discharge from the slot 25, so that cracking of the glass 11 is further guarded against. The attachment, at its opposite end, is open so that when the attachment is applied to the windshield, a vertical exit slot 26 is provided through which the hot air, having served its function, escapes.

It will be seen from the foregoing description that the apparatus is so constructed that a stream of heated air of the same vertical height as the windshield glass is discharged across the rear face thereof and removed from the region thereof, so as to subject as nearly as may be practically possible, the entire rear face of the windshield to substantially uniform heat transfer conditions as between it and the moving stream of heated air. Thus there is prevented any serious tendency for the development of localized conditions of wide temperature variations with respect to the average conditions being maintained, with the result that the entire outer face of the windshield is protected against ice and frost formation.

In accordance with the present invention, the arrangement is such that the attachment, when in place, forms with the windshield a thin chamber or interspace 27 which tapers down in thickness from its inlet at the left Figure 1 to its outlet end at the right so that the velocity of the air, as it passes through this chamber, is accelerated or progressively increased over the length of the chamber. In the present instance, in order to obtain a tapering of the chamber from its entrance end to its exit end, the wooden rails 22 gradually decrease in horizontal width from the entrance end to the exit end of the attachment. The transverse or cross-sectional area of the inlet end of the interspace is larger than that of the exit slot 26. In the present illustrative disclosure, I have found that a spacing of the plastic pane from the window at the entrance end of the interspace of substantially three-eighths of an inch, and a spacing of the pane from the window at the exit end of the interspace of substantially one-quarter of an inch are the most practical from a mechanical standpoint. Thus, the transverse area of the interspace at its entrance end is substantially one and one-half times the area of the exit slot 26. The cross-sectional area of the inlet pipe 24 may be substantially the same as the area of the exit slot. Hot air may be supplied at 225° F. to the distributor under such pressure that the velocity of the air as it passes into the entrance end of the interspace or chamber 27 is approximately 4500 feet per minute. With this arrangement, the velocity of the air as it passes through the interspace or chamber 27 is progressively increased and if it has a velocity of 4500 F. P. M. as it flows into the interspace, it will have a velocity of substantially 6750 feet per minute as it flows out of said space at the exit end thereof.

The advantages of the arrangement so far described may be more readily understood from the following explanation: When air moves through a conduit or chamber, the air at the center of the column moves at a greater velocity than the air nearer to the walls of the conduit, and this latter air tends to form a surface film which acts as a heat insulator in that it retards the flow of heat from the hot moving air to the conduit wall. In accordance with this invention, in order to remove or neutralize this surface layer, the velocity of the moving air, introduced into the space 27, is sufficiently high to obtain a "scrubbing" effect or action. The result of this "scrubbing" action is to reduce the thickness of the relatively stationary film of air at the rear surface of the pane 11 to increase the rate of heat transfer to it. In the event that air is passed through a chamber or interspace between two parallel panes (such as a windshield glass and a panel of plastic material) at uniform velocity, the heat transfer between the heated air and the windshield is greatest at the entering portion of the chamber and grows progressively less towards the exit end. If the air is passed through the chamber at a sufficiently high velocity to obtain a "scrubbing" effect over the desired or entire area of the windshield, the air may be so hot at the entrance end of the chamber that the glass is likely to be broken and, on the other hand, if the velocity is not sufficient to effect a scrubbing action throughout the desired area, the de-icing action may progress only part way and then stop before the exit end of the chamber is reached. With my improved arrangement, the various requirements for an effective de-icing action throughout the desired or entire area of the windshield may be carried out without excessively heating the glass or the plastic pane at any point.

By insulating the distributor from the window by means of the pad 23 and directing the stream of entering air parallel to, and slightly rearwardly of, the surface of the glass, cracking of the glass adjacent the entrance end of the interspace is prevented. These factors required that the interspace, at its entrance end, be wider than would otherwise be the case, but nevertheless, the ice and frost will be effectively removed from the window at the entrance end of the interspace as the temperature of the entering air is high enough to effect such removal, but if the interspace were not thereafter tapered down in width, the air which becomes cooler as it passes through the interspace would not be effective in entirely removing the ice from the window towards the exit end of the interspace. By tapering the interspace down throughout its length towards the exit end, the ice is effectively removed by the air throughout the area of the window covered by my improved attachment. This is due to the fact that the velocity of the air, as it passes through the chamber or interspace, is progressively increased from the entrance end to the exit end of the chamber. Thus, as the air is hottest as it enters the interspace or chamber, it is desirable that the scrubbing action be decreased at this point in order to prevent excessive heating and resultant breaking of the glass, and as the air progresses through the chamber, it becomes cooler but as its acceleration is increased, the scrubbing effect is correspondingly increased so that a proper exchange of heat between the air and the windshield is provided over the entire area to which the attachment is applied.

It will be seen from the various figures that the tapering down of the interspaces between the two panes in a direction from the inlet point of the heated air to the outlet point is uniform, which has been found to produce a progressively increasing velocity and a scrubbing action by the heated air towards the outlet in amount to progressively compensate fully for the loss in heat content or reduction in temperature of the air as it progresses from the inlet to the outlet. In other words, the combined effect of the increase in velocity of the air and the increase in its scrubbing action along the rear face of the front pane balances the opposite effect represented by the temperature gradient longitudinally of the space from one end to the other. The result is that substantially as much heat is available at any one area of the windshield glass as at any other area, so that clear vision is insured under all conditions likely to be encountered.

Referring now more specifically to the other features of the construction of the de-icer illustrated in the drawings, the manifold 16, which may be formed of aluminum or other lightweight material, comprises two complementary parts 35 and 36 secured together as by screws 37 so as to provide a distributing or header chamber 38. The pad or felt 23 is secured to the forward wall of the manifold so as to heat insulate the same from the glass windshield. The inner edge of the rear wall of the manifold is offset, as at 39, to provide a ledge or seat for the adjacent edge of the plastic pane 15. About this edge of the pane is a strip 40 of asbestos or the like. A bracket or clip 41 is secured to the central portion of the rear wall of the manifold (see Figure 1) and extends inwardly over the adjacent edge of the pane 15 to hold it on the seat 39.

The angle bars 20 of the top and bottom frame units are also preferably made of lightweight metal, such as aluminum. The rails 22 may be formed from basswood. The rails are secured to the horizontal flanges of the bars 20 by rivets 42. The upper and lower edges of the transparent pane 15 loosely extend a limited distance into the channels 21 so that the pane may expand and contract without danger of buckling or rippling. The end frame member 17 is in the form of an aluminum bar or strip of L-shape in cross-section, as shown most clearly in Figure 10. The narrow flange on this member is substantially coextensive with the end edge of the plastic pane. The angle bars 20 are secured at one end to the manifold by screws 43 and at the other end to the frame member 17 by screws 44. The right hand edge of the plastic pane is notched, as at 45 (see Figures 1 and 9), so as to accommodate a clip 46 which is secured by a rivet 47 to the frame member 17. The ends of the clip engage the front surface of the plastic pane, and the clip serves to prevent undue warping or flexing of the edge of the pane.

Further, in accordance with the present invention, there is provided means of a simplified and improved form whereby the device may be very quickly and easily secured to and detached from the window frame as a unit. In the present instance, four attaching means are illustrated, and as these attaching means are substantially identical in construction, a description of one will apply to all. Each includes a clip 50 secured to the window frame 12 and a latch bar 51 fixed to the forward end of a shaft or stud 52 suitably journaled in the frame of the attachment. The clip 50, as shown most clearly in Figure 11, is in the form of a thin gauge sheet metal strip secured at its opposite ends to the frame 12 by rivets or pins 53. To opposite sides of the central portion 54 of the strip, the strip is bent outwardly, as at 55, and then inclined forwardly, as at 56. Extending forwardly from the inner face of the central portion and to opposite sides of the center line thereof are teats or nibs 57 which lie closely adjacent to the inner face of the window frame 12. The latch bar 51 is in the form of a flat metal piece with its side edges beveled or wedge-shaped, as shown most clearly in Figure 1, so that, when the bar is turned into and out of securing position, the inclined edges of the bar will engage the nibs 57 and thereby cam the central portion of the clip rearwardly of the frame 12. When the locking bar is in the securing position, as shown in Figure 1, the bar fits between the nibs 57 and thus accidental opening of the latch is prevented. The stud or shaft 52 is journaled in a bushing 60 which is supported by the vertical web of the angle bar 20 and by a plate 62. The plate 62 is secured, as by rivets, 63, to the vertical web of the bar 20. One edge of this plate overlaps the adjacent edge of the plastic pane 15. The bushing has an enlarged bore, and positioned in this bore and surrounding the stem of the stud or shaft 52 is a coiled spring 65. One end of the spring engages the bottom of the bore and the other end bears against a shoulder 66 on the forward end of the head of the stud 52. The plastic pane is notched, as at 67, and the rail 22 is notched, as at 68, so as to accommodate the latch bar. The inner side of the notch 68 is closed by a cover plate 69 which may serve to limit the extent of rotation of the latch bar when the latter is turned to unlatching position. This plate is secured to the rail by screws 70. Secured to the outer end of the shafts 53 are thumb pieces

71 by means of which the shafts and the latch bars may be rotated into and out of latching position. These thumb pieces extend to only one side of the axis of the shaft so that the direction of rotation of the latch bar, when it is desired to move the same into and out of latching position, is clearly indicated. The thumb pieces may be secured in place in slots on the rear ends of the shafts 52 by means of rivets 72.

It will be noted that the stud or shaft 52 of each securing means is mounted for limited axial movement in its bushing 60, and the coiled spring 65 normally urges the stud or shaft rearwardly. The purpose of this arrangement is to avoid twisting or distortion of the frame when it is secured in place, twisting of the frame being undesirable as it would result in distortion of the transparent plastic pane. The pane, being formed of plastic material has a high coefficient of expansion under temperature changes so it is not desirable that the frame so press upon, or bind the action of, the pane as to result in distortion thereof, particularly when it is subjected to the heat of the air passing through the interspace. As previously stated, the longitudinal edges of the pane 15 extend more or less loosely, and to a limited extent, into the channels 21 provided in the upper and lower frame units. The pane also is of such length that it may expand or move in a horizontal direction. Thus the pane is mounted in the frame for free movement and for contraction and expansion in all directions in the plane of the pane. It is found that the rear faces of the frames 12 of like windshields are not uniformly spaced from the windows and, in some instances, the rear face of a frame of a windsheld will vary from point around the periphery of the window. If the studs 52 and the latch bars carried thereby were not mounted for axial movement, the frame would be twisted when it was secured in place with the result it would bind on the pane so that the pane would not be free or expand and contract. This would result in distortion with the present arrangement but for the fact that the studs have a limited axial movement which will take care of variations in the frames of the window while, at the same time, the springs will press the latch bars against the clips 50 which are secured to the rear surface of frame of the window.

From the foregoing description taken in connection with the accompanying drawings, it will be seen that, in accordance with the present invention, there is provided a very effective arrangement by means of which the formation of ice or frost throughout the desired area of the windshield is prevented, or which may be used to remove any ice which may have already formed on the windshield.

At this point it may be specifically noted, in order that it should be well understood, that the device of this invention is fully effective in preventing the fogging of the windshield proper, as well as of the plastic pane 15, it being the intention to include fog within the term frost as used throughout the disclosure.

The construction is an extremely simple and light one, and the parts may be manufactured very cheaply and assembled in a very economical manner. The means for securing the attachment in place is also very simple and may be economically manufactured and applied. The attachment may be removed from the window in an exceedingly short space of time, a feature which is of great importance where the attachment is used in fighting aircraft.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. An attachment for windshields for preventing the formation of ice and frost thereon and comprising a frame the forward face of which is adapted to engage a windshield pane, a transparent pane secured to the rear face of said frame, a slotted distributor built into said frame and forming one member thereof having its slot spaced forwardly of said second mentioned pane, an inlet pipe for said distributor for supplying hot air to the space between said pane and the windshield pane, and a heat insulating pad on the forward face of said distributor for preventing the incoming air from overheating the adjacent area of the windshield pane.

2. In combination, a windshield having a frame and a window pane, an attachment for preventing the formation of ice and frost on said window pane comprising a frame the forward face of which is adapted to engage said pane, and a pane secured to the rear face of said frame; and means for removably securing said attachment to said windshield frame and comprising a clip having its opposite ends secured to said window frame and provided between its ends with a resilient portion having laterally spaced apart nibs opposed to the rear face of said windshield frame, a stud journaled in said attachment frame, and a latch bar secured to said stud and adapted to be moved into and out of position between said nibs.

3. In combination, a windshield having a frame and a window pane, an attachment for preventing the formation of ice and frost on said window pane comprising a frame the forward face of which is adapted to engage said pane, and a pane secured to the rear face of said frame; and means for removably securing said attachment to said windshield frame and comprising a clip having its opposite ends secured to said window frame and provided between its ends with a resilent portion having laterally spaced apart nibs opposed to the rear face of said windshield frame, a stud journaled in said attachment frame, a latch bar secured to said stud and adapted to be moved into and out of position between said nibs, and spring means associated with said stud for preventing accidental rotation thereof.

4. In an attachment for windshields for preventing the formation of ice and frost thereon, in combination, a frame the forward end of which is adapted to engage a windshield, a transparent pane secured to the rear face of said frame, said frame comprising four members forming a generally rectangular figure, a distributor built into one of said frame members and having a slot spaced forwardly of said transparent pane, said frame members which extend substantially perpendicular to said distributor member being of uniformly decreasing thickness from said distributor member outwardly, whereby said attachment forms with the windshield a space of uniformly decreasing cross-sectional area, and an inlet pipe for said distributor for supplying hot air to the space between said attachment and the windshield to which it is applied.

5. In an attachment for windshields for preventing the formation of ice and frost thereon, in combination, a frame the forward end of which is adapted to engage a windshield, a transparent pane secured to the rear face of said frame, said frame comprising four members forming a generally rectangular figure, a distributor built into one of said frame members and having a slot spaced forwardly of said transparent pane, said frame members which extend substantially perpendicular to said distributor member being of uniformly decreasing thickness from said distributor member outwardly, whereby said attachment forms with the windshield a space of uniformly decreasing cross-sectional area, an inlet pipe for said distributor for supplying hot air to the space between said attachment and the windshield to which it is applied, and an outlet slot in the frame member extending parallel to said distributor member, said distributor member, outlet and space between said attachment and said windshield providing for increased velocity of air flow through the space as the temperature of the air decreases, whereby the ice and frost removing effect is substantially constant.

6. An attachment as claimed in claim 5 wherein said distributor and said outlet extend for substantially the full length of the parallel edge of said transparent pane.

7. An attachment as claimed in claim 5 characterized in that the cross-sectional area of the space between the windshield and the attachment at the inlet end is substantially one and one-half times the cross-sectional area of the space at the outlet end.

HORACE H. RAYMOND.

REFERENCES CITED

The following references are of record in the file of this patent:

UNITED STATES PATENTS

| Number | Name | Date |
|---|---|---|
| 1,745,652 | Watson | Feb. 4, 1930 |
| 1,790,419 | Heinemann | Jan. 27, 1931 |
| 2,030,258 | Knecht | Feb. 11, 1936 |
| 2,096,901 | Knecht | Oct. 26, 1937 |
| 2,302,397 | Spackman | Nov. 17, 1942 |